(12) United States Patent
Lee et al.

(10) Patent No.: US 9,601,075 B2
(45) Date of Patent: Mar. 21, 2017

(54) DISPLAY PANEL, METHOD OF MANUFACTURING THE DISPLAY PANEL AND DISPLAY APPARATUS

(71) Applicant: SAMSUNG DISPLAY CO., LTD., Yongin, Gyeonggi-Do (KR)

(72) Inventors: Bong-Jun Lee, Seoul (KR); Ji-Young Jeong, Cheonan-si (KR); Ju-Hyeon Baek, Asan-si (KR); Dong-Wuuk Seo, Asan-si (KR); Byeong-Jae Ahn, Asan-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 260 days.

(21) Appl. No.: 14/319,233

(22) Filed: Jun. 30, 2014

(65) Prior Publication Data

US 2015/0194116 A1    Jul. 9, 2015

(30) Foreign Application Priority Data

Jan. 8, 2014   (KR) .................. 10-2014-0002314

(51) Int. Cl.
*G06F 1/00* (2006.01)
*G09G 3/36* (2006.01)
*G02F 1/1335* (2006.01)
*G02F 1/1333* (2006.01)

(52) U.S. Cl.
CPC ..... *G09G 3/3685* (2013.01); *G02F 1/133512* (2013.01); *G02F 1/133514* (2013.01); *G02F 2001/133388* (2013.01); *G09G 2310/0283* (2013.01); *Y10T 29/49117* (2015.01)

(58) Field of Classification Search
CPC ..... G09G 3/3685; G02F 1/1335; H04N 5/335
See application file for complete search history.

(56) References Cited

U.S. PATENT DOCUMENTS

2007/0146518 A1*  6/2007  Hong ................ G02F 1/134336
                                                                            348/308
2013/0033654 A1*  2/2013  Kim .................. G02F 1/133509
                                                                            349/38

FOREIGN PATENT DOCUMENTS

| JP | 4420620 B2 | 12/2009 |
| JP | 4711404 B2 | 4/2011 |
| JP | 2011-128443 A | 6/2011 |
| KR | 10-2004-0052351 A | 6/2004 |
| KR | 10-884992 B1 | 2/2009 |
| KR | 10-2010-0075023 A | 7/2010 |

* cited by examiner

*Primary Examiner* — Michael Faragalla
(74) *Attorney, Agent, or Firm* — Cantor Colburn LLP

(57) ABSTRACT

A display panel includes a plurality of pixels disposed in an active area and arranged substantially in a matrix form including a pixel row and a pixel column, a first gate line disposed adjacent to a first side n of the pixel row and connected to a first pixel in the pixel row, a second gate line disposed adjacent to a second side of the pixel row and connected to a second pixel in the pixel row, a plurality of data lines crossing the first and second gate lines, where the pixels in a pair of adjacent pixel columns are connected to a same data line, and a blocking pattern which overlaps a pixel column disposed in an end portion of the active area.

18 Claims, 12 Drawing Sheets

<FORWARD MODE>

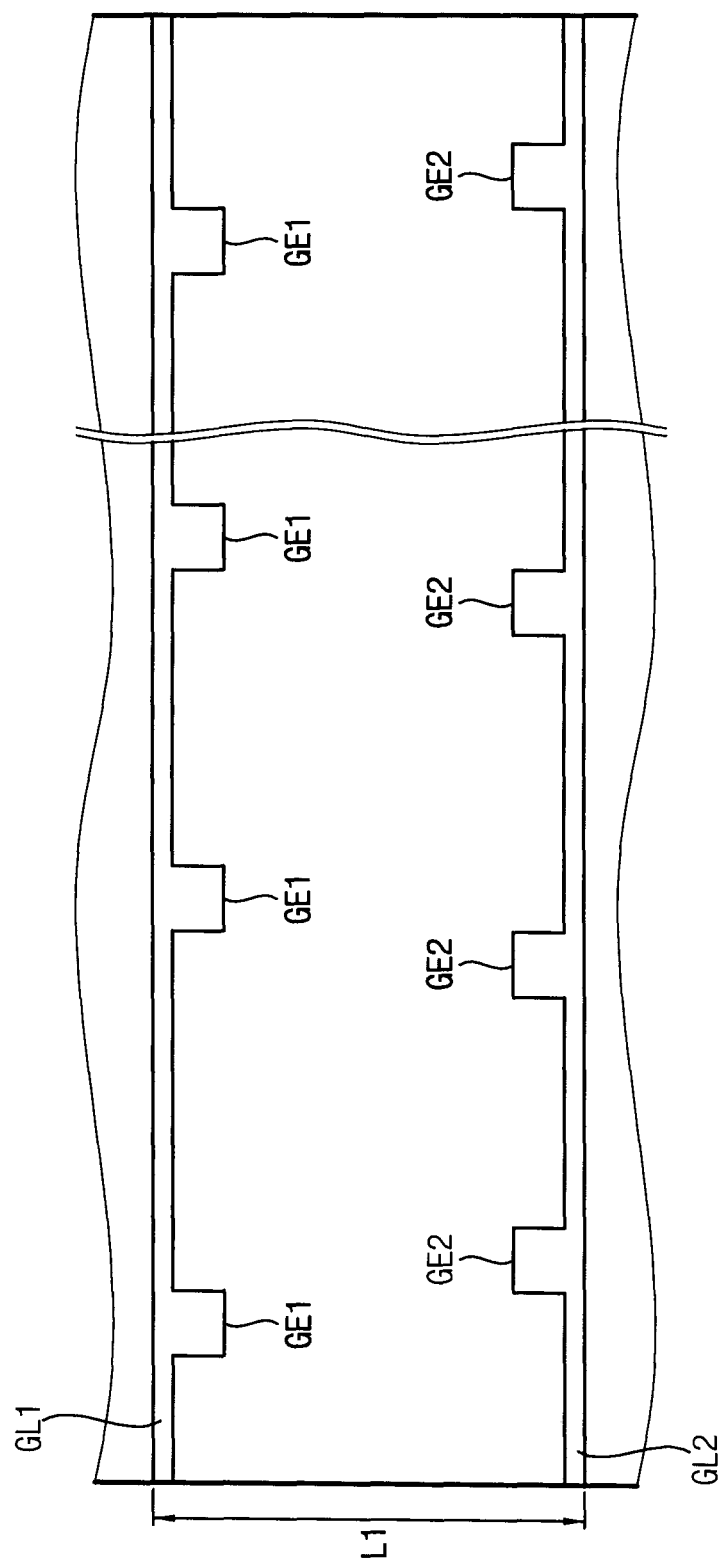

<REVERSE MODE>

<FORWARD MODE>

<REVERSE MODE>

DISPLAY PANEL, METHOD OF MANUFACTURING THE DISPLAY PANEL AND DISPLAY APPARATUS

This application claims priority to Korean Patent Application No. 10-2014-0002314, filed on Jan. 8, 2014, and all the benefits accruing therefrom under 35 U.S.C. §119, the content of which in its entirety is herein incorporated by reference.

BACKGROUND

1. Field

Exemplary embodiments of the invention relate to a display panel, a method of manufacturing the display panel and a display apparatus having the display panel. More particularly, exemplary embodiments of the invention relate to a display panel with improved display quality and manufactured by simplified processes, a method of manufacturing the display panel and a display apparatus including the display panel.

2. Description of the Related Art

Generally, a liquid crystal display ("LCD") apparatus includes an LCD panel and a driving device for driving the LCD panel. The LCD panel includes a plurality of data lines and a plurality of gate lines crossing the data lines. Thus, a plurality of pixels of the LCD panel may be connected to the data lines and the gate lines. The driving device includes a gate driving circuit for outputting a gate signal to a gate line and a data driving circuit for outputting a data signal to a data line.

Recently, in order to decrease a total size of the LCD apparatus and a manufacturing cost thereof, a pixel structure configured to decrease the number of data lines and the number of data driving circuit has been used. In such a LCD apparatus, two pixels adjacent to each other may share one data line in the pixel structure. Thus, a plurality of pixels included in two pixel columns shares one data line so that the number of data lines is decreased. However, a plurality of pixels included in one pixel row is electrically connected to two gate lines adjacent to each other, and two gate signals different from each other are applied to two gate lines.

In addition, recently, the LCD panel may display an image along a scan direction of a forward-direction or display the image along the scan direction of a reverse-direction opposite to the forward-direction.

SUMMARY

Exemplary embodiments of the invention provide a display panel with improved display quality and manufactured by simplified processes.

Exemplary embodiments of the invention provide a method of manufacturing the display panel.

Exemplary embodiments of the invention provide a display apparatus including the display panel.

According to an exemplary embodiment of the invention, a display panel includes a plurality of pixels disposed in an active area and arranged substantially in a matrix form including a pixel row and a pixel column, a first gate line disposed adjacent to a first side of the pixel row and connected to a first pixel in the pixel row, a second gate line disposed adjacent to a second side of the pixel row and connected to a second pixel in the pixel row, a plurality of data lines crossing the first and second gate lines, where the pixels in a pair of adjacent pixel columns are connected to a same data line, and a blocking pattern which overlaps an pixel column which is disposed in an end portion of the active area.

In an exemplary embodiment, the blocking pattern may be disposed in a right end portion of the active area.

In an exemplary embodiment, the pixels may include the first pixel connected to a first data line and the first gate line, the second pixel connected to the first data line and the second gate line, a third pixel connected to a second data line and the second gate line, a fourth pixel connected to the second data line and the first gate line, a fifth pixel connected to a third data line and the second gate line, a sixth pixel connected to the third data line and the first gate line, a (K-1)-th sixth pixel connected to an M-th data line and the first gate line, where the M-th data line is a last data line disposed in the right end portion, and each of M and K is a natural number, and a K-th sixth pixel connected to the M-th data line and the second gate line, wherein the first, second, third, fourth, fifth, sixth, (K-1)-th and K-th pixels may be disposed in the pixel row.

In an exemplary embodiment, the blocking pattern may overlap a (K-1)-th pixel column and a K-th pixel column respectively corresponding to the (K-1)-th and K-th pixels.

In an exemplary embodiment, the first, fourth and (K-1)-th pixels may include a first color filter, the second, fifth and K-th pixels may include a second color filter, and the third and sixth pixels may include a third color filter.

In an exemplary embodiment, the first gate line may be disposed before the second gate line in a scan direction, such that the first gate line may be activated and then the second gate line is activated.

In an exemplary embodiment, the first color filter may be a red filter, the second color filter may be a green filter, and the third color filter may be a blue filter.

According to an exemplary embodiment of the invention, a method of manufacturing a display panel includes providing first to N-th gate lines and a gate electrode of a transistor in an active area of a base substrate, where N is a natural number, providing first to M-th data lines crossing gate lines, source electrode of the transistor and a drain electrode of the transistor in the active area on the base substrate, wherein M is a natural number, providing pixel electrodes of a pixel row, which are connected to a pair of adjacent gate lines, in the active area on the base substrate, where the pixel electrodes of the pixel row in a pair of adjacent pixel columns are connected to a same data line, and providing a blocking pattern to overlap the pixel electrodes of a pixel column disposed in an end portion of the active area.

In an exemplary embodiment, the method may further include providing a gate control line disposed in a peripheral area adjacent to the active area in which the first gate line is disposed, where the gate control line is connected to an input terminal of a gate driver circuit which provides the first to N-th gate lines with a plurality of gate signals.

In an exemplary embodiment, the providing the pixel electrodes of the pixel row may include providing a first pixel electrode connected to the first data line and the first gate line, providing a second pixel electrode connected to the first data line and the second gate line, providing a third pixel electrode connected to the second data line and the second gate line, providing a fourth pixel electrode connected to the second data line and the first gate line, providing a fifth pixel electrode connected to the third data line and the second gate line, providing a sixth pixel electrode connected to the third data line and the first gate line, providing a (K-1)-th pixel electrode connected to the M-th data line and the first gate line, where the M-th data line is a last data line disposed in the end portion of the active area, and K is a natural number, and providing a K-th pixel electrode connected to the M-th data line and the second gate line, where the first, second, third, fourth, fifth, sixth, (K-1)-th and K-th pixel electrodes may be disposed in the pixel row.

In an exemplary embodiment, the blocking pattern may overlap the (K-1)-th pixel electrode and the K-th pixel electrodes.

In an exemplary embodiment, the method may further include providing red, green and blue filters to overlap the pixel electrodes, where the red filter may overlap the first, fourth and (K-1)-th pixel electrodes, the green filter may overlap the second, fifth and K-th pixel electrodes, and the blue filter may overlap the third and sixth pixel electrodes.

In an exemplary embodiment, the method may further include providing a gate control line disposed in a peripheral area adjacent to the active area in which the N-th gate line is disposed, where the gate control line is connected to an input terminal of a gate driver circuit which provides the first to N-th gate lines with a plurality of gate signals.

In an exemplary embodiment, the providing the pixel electrodes of the pixel row may include providing a K-th pixel electrode connected to the M-th data line and the second gate line, providing a (K-1)-th pixel electrode connected to the M-th data line and the first gate line, providing a (K-2)-th pixel electrode connected to the (M-1)-th data line and the first gate line, providing a (K-3)-th pixel electrode connected to the (M-1)-th data line and the second gate line, providing a (K-4)-th pixel electrode connected to the (M-2)-th data line and the first gate line, providing a (K-5)-th pixel electrode connected to the (M-2)-th data line and the second gate line, providing a second pixel electrode connected to a first data line and the second gate line, where the first data line is a last data line disposed in the end portion of the active area, and K is a natural number, and providing a first pixel electrode connected to the first data line and the first gate line, where the K-th, (K-1)-th, (K-2)-th, (K-3)-th, (K-4)-th, (K-5)-th, second and first pixel electrodes may be disposed in the pixel row.

In an exemplary embodiment, the blocking pattern may overlap the first pixel electrode and the second pixel electrodes.

In an exemplary embodiment, the method may further include providing red, green and blue filters to overlap the pixel electrodes, where the red filter may overlap the K-th, (K-3)-th and second pixel electrodes, the green filter may overlap the (K-1)-th, (K-4)-th and first pixel electrodes and the blue filter may overlap the (K-2)-th and (K-5)-th pixel electrodes.

According to an exemplary embodiment of the invention, a display apparatus includes a display panel including first to N-th gate lines which are sequentially arranged from an upper side to a lower side with respect to an active area, first to M-th data lines which are sequentially arranged from a left to a right with respect to the active area, a plurality of pixels arranged substantially in a matrix form including pixel rows and pixel columns, where the pixels in a same pixel row are connected to a pair of adjacent gate lines, the pixels in a pair of adjacent pixel columns are connected to a same data line, and each of M and N is a natural number, a gate driver circuit configured to provide a plurality of gate signals with the first to N-th gate lines, and a data driver circuit disposed in a peripheral area adjacent to the first data line and configured to provide a pixel column disposed in a right end portion of the active area with a data signal corresponding to a black image.

In an exemplary embodiment, the data driver circuit may be configured to provide the first to (M-1)-th data lines with the data signal corresponding to a normal image and to provide the M-th data line with the data signal corresponding to the black image.

According to an exemplary embodiment of the invention, a display apparatus includes a display panel comprising N-th to first gate lines which are sequentially arranged from an upper side to a lower side in an active area, M-th to first data lines which are sequentially arranged from a left side to a right side in the active area, a plurality of pixels arranged substantially in a matrix form including pixel rows and pixel columns, where the pixels in a same pixel row are connected to a pair of adjacent gate lines, the pixels in a pair of adjacent pixel columns are connected to a same data line, and each of M and N is a natural number, a gate driver circuit configured to sequentially provide a plurality of gate signals with the N-th to first gate lines and a data driver circuit disposed in a peripheral area adjacent to the first data line and configured to provide a pixel column disposed in a right end portion of the active area with a data signal corresponding to a black image.

In an exemplary embodiment, the data driver circuit may be configured to provide M-th to second data lines with the data signal corresponding to a normal image and to provide the first data line with the data signal corresponding to the black image.

According to exemplary embodiments of the invention described herein, processes of manufacturing the reverse-direction display panel may use partial masks used in processes of manufacturing the forward-direction display panel such that the processes of manufacturing the reverse-direction display panel may be simplified and manufacturing cost may be decreased. In such embodiments, where the luminance conduciveness of the first and second color filters may be greater than the luminance conduciveness of the third color filter, the pixels having the first or second color filter are connected to the same gate line and the pixels having the third color filter B are alternately connected to the pair of adjacent gate lines. Thus, in such embodiments, a luminance uniformity of the forward-direction display panel and the reverse-direction display panel may be improved.

BRIEF DESCRIPTION OF THE DRAWINGS

The above and other features of the invention will become more apparent by describing in detailed exemplary embodiments thereof with reference to the accompanying drawings, in which:

FIGS. 4A to 4D are plan views illustrating an exemplary embodiment of a method of manufacturing the forward-direction display panel of FIG. 3;

DETAILED DESCRIPTION

Figure 1:
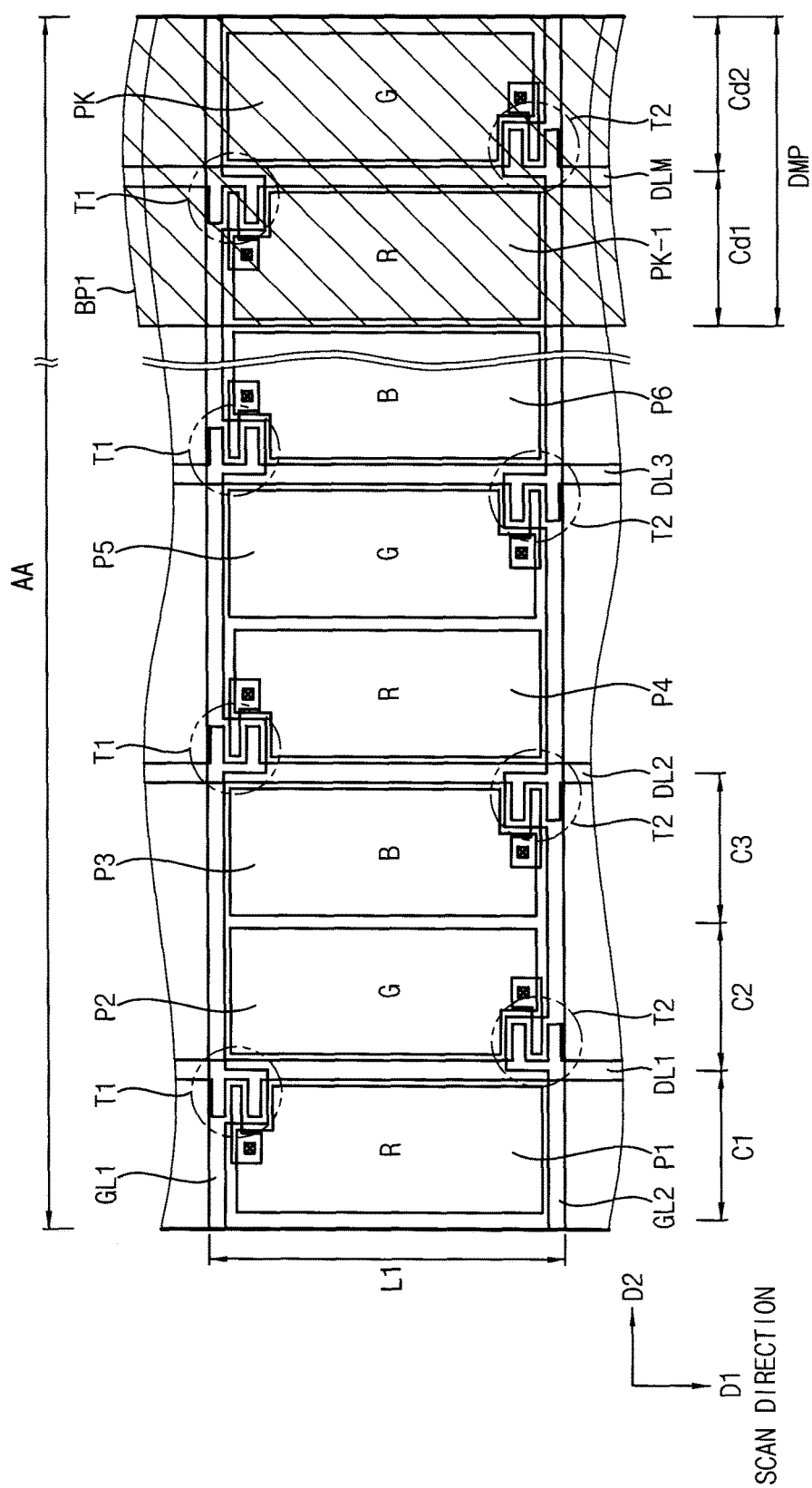
FIG. 1 is a plan view illustrating an exemplary embodiment of a display panel according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, the invention will be explained in detail with reference to the accompanying drawings.

FIG. 1 is a plan view illustrating an exemplary embodiment of a display panel according to the invention.

Referring to FIG. 1, the display panel may include an active area AA. The display panel further includes a plurality of data lines, a plurality of gate lines and a plurality of pixels, which are disposed in the active area AA.

The data lines DL1, DL2, DL3, . . . , DLM extend substantially in a first direction D1 and arranged substantially in a second direction D2 crossing the first direction D1 (here, M is a natural number).

The gate lines GL1 and GL2 extend substantially in the second direction D2 and arranged substantially in the first direction D1.

The plurality of pixels may include a plurality of color filters R, G and B, and may be arranged substantially in a matrix form including a pixel row and a pixel column. The pixel column includes pixels which are arranged substantially in the first direction D1, and the pixel row includes pixels which are arranged substantially in the second direction D2.

As shown in FIG. 1, the pixels of a pair of adjacent pixel columns are electrically connected to a same data line, and the pixels of a same pixel row are alternately connected to a pair of adjacent gate lines which is sequentially activated.

The pixels in the same pixel column include a same color filter R, G or B and the pixels in the same pixel row include a first color filter R, a second color filter G and a third color filter B. In such an embodiment, the first color filter R may be a red color filter, the second color filter G may be a green color filter, and the third color filter B may be a blue color filter. In one exemplary embodiment, for example, a first pixel P1 in a first pixel column C1 includes the first color filter R, a second pixel P2 in a second pixel column C2 includes the second color filter G and a third pixel P3 in a third pixel column C3 includes the second third pixel P3. The first pixel row L1 includes the first, second and third pixels P1, P2 and P3.

In an exemplary embodiment, the display panel may include a dummy pixel part DMP which is disposed in an end portion, e.g., a right end portion, of the active area AA.

The dummy pixel part DMP may include at least one dummy pixel column and a blocking pattern BP1. In an exemplary embodiment, the dummy pixel part DMP may include a first dummy pixel column Cd1 and a second dummy pixel column Cd2.

The first dummy pixel column Cd1 may be a (K-1)-th pixel column CK-1 having the first color filter R and the second dummy pixel column Cd2 may be a K-th pixel column CK having the second color filter G.

The blocking pattern BP1 overlaps the first and second dummy pixel columns Cd1 and Cd2, and blocks light transmitted through the first and second dummy pixel columns Cd1 and Cd2.

As shown in FIG. 1, the first pixel row L1 includes the first, second, third, fourth, fifth and sixth pixels P1, P2, P3, P4, P5 and P6.

The first and second pixels P1 and P2 are connected to a first data line DL1. The first and second pixels P1 and P2 are connected to the first and second gate lines GL1 and GL2. The first pixel P1 having the first color filter R is electrically connected to the first data line DL1 and the first gate line GL1 through a first transistor T1. The second pixel P2 having the second color filter G is electrically connected to the first data line DL1 and the second gate line GL2 through a second transistor T2.

The third and fourth pixels P3 and P4 are connected to a second data line DL2. The third and fourth pixels P3 and P4 are connected to the first and second gate lines GL1 and GL2. The third pixel P3 having the third color filter B is electrically connected to the second data line DL2 and the second gate line GL2 through a second transistor T2. The fourth pixel P4 having the first color filter R is electrically connected to the second data line DL2 and the first gate line GL1 through a first transistor T1.

The fifth and sixth pixels P5 and P6 are connected to a third data line DL3. The fifth and sixth pixels P5 and P6 are connected to the first and second gate lines GL1 and GL2. The fifth pixel P5 having the second color filter G is electrically connected to the third data line DL3 and the second gate line GL2 through a second transistor T2. The sixth pixel P6 having the third color filter B is electrically connected to the third data line DL3 and the first gate line GL1 through a first transistor T1.

In an exemplary embodiment, the (K-1)-th and K-th pixels PK-1 and PK, which are disposed in the right end portion, are connected to an M-th data line DLM. The (K-1)-th and K-th pixels PK-1 and PK are connected to the first and second gate lines GL1 and GL2. The (K-1)-th pixel PK-1 having the first color filter R is electrically connected to the M-th data line DLM and the first gate line GL1 through a first transistor T1. The K-th pixel PK having the second color filter G is electrically connected to the M-th data line DLM and the second gate line GL2 through a second transistor T2.

The (K-1)-th and K-th pixels PK-1 and PK may be driven by the M-th data line DLM, the first gate line GL1, and the second gate line GL2, but covered by the blocking pattern BP1 such that an image displayed on the (K-1)-th and K-th pixels PK-1 and PK may be not seen by a viewer.

In an exemplary embodiment, the M-th data line DLM may receive a predetermined data signal to drive the (K-1)-th and K-th pixels PK-1 and PK.

In an exemplary embodiment, the first, fourth and (K-1)-th pixels P1, P4 and PK-1 among the pixels in the first pixel row L1 that is the same pixel row, include the first color filter R and are electrically connected to the first gate line GL1 among a pair of adjacent gate lines GL1 and GL2. The first gate line GL1 is firstly activated according to a scan direction.

The second, fifth and K-th pixels P2, P5 and PK among the pixels in the first pixel row L1 include the second color filter G and are electrically connected to the second gate line GL2 among the pair of adjacent gate lines GL1 and GL2. The second gate line GL2 is next activated according to the scan direction.

The third and sixth pixels P3 and P6 among the pixels in the first pixel row L1 include the third color filter B and are alternately connected to the pair of gate lines GL1 and GL2.

The pixels in the same pixel row may have a pixel connecting structure as shown in FIG. 1, based on a kickback voltage of the gate signal applied to the gate line and a luminance conduciveness.

According to an exemplary embodiment, the first to sixth pixels P1, P2, P3, P4, P5 and P6 are repetitively disposed in the same pixel row, and the (K-1)-th and K-th pixels PK-1 and PK are disposed in the right end portion of the active area AA.

Figure 2A:
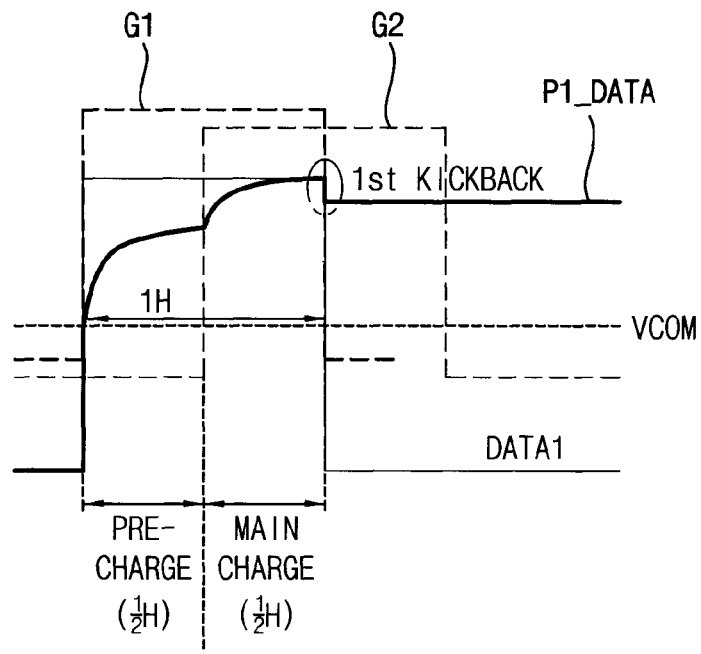
FIGS. 2A and 2B are waveform diagrams illustrating an exemplary embodiment of a method of driving a pixel of FIG. 1.
Figure 2B:
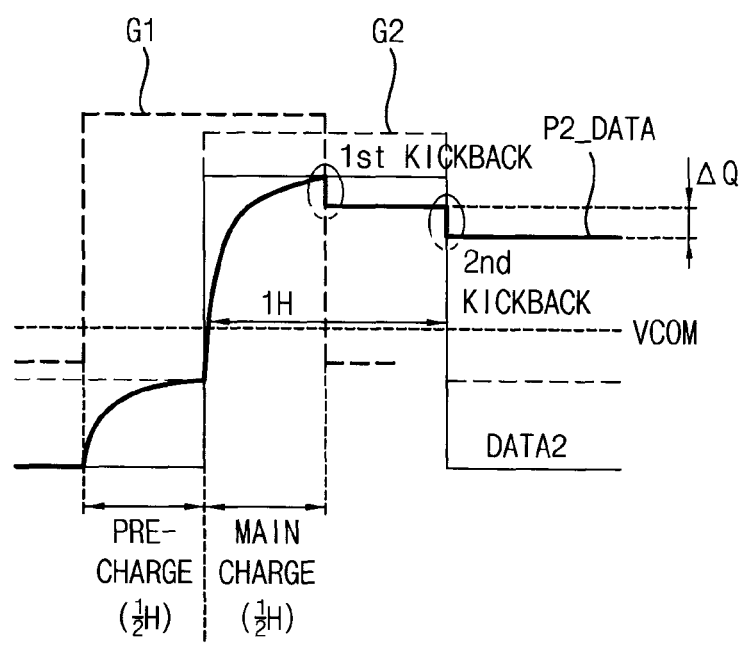

FIGS. 2A and 2B are waveform diagrams illustrating an exemplary embodiment of a method of driving a pixel of FIG. 1.

FIG. 2A is a waveform diagram illustrating an exemplary embodiment of a method of driving the first pixel P1 connected to the first gate line GL1 which is firstly driven through the first transistor T1. FIG. 2B is a waveform diagram illustrating an exemplary embodiment of a method of driving the second pixel P2 connected to the second gate line GL2 which is next driven through the second transistor T2.

Referring to FIGS. 1, 2A and 2B, the first and second pixels P1 and P2 connected to the first data line DL1 respectively charge first and second data signals in response to first and second gate signals G1 and G2 applied to the first and second gate lines GL1 and GL2.

The first and second gate signals G1 and G2 respectively have a pulse of one horizontal period 1H and overlaps each other by ½ horizontal period ½ H.

The first data line DL1 receives the first data signal DATA1 corresponding to the first pixel P1. The first pixel P1 firstly charges the first data signal DATA1 in response to the first gate signal G1 during the horizontal period 1 H. A first half period of a charging period 1 H of the first data signal G1, e.g., an early ½ H period of the first gate signal G1, is referred to as a pre-charging period, and a second half of the charging period 1 H of the first data signal G1, e.g., a late ½ H period of the first gate signal G1, is referred to as a main-charging period.

In an exemplary embodiment, as shown in FIG. 2A, a first pixel data voltage P1_DATA is charged in the first pixel P1, and the first pixel data voltage P1_DATA includes a first kickback voltage occurring at a falling edge timing of the first gate signal G1.

And then, the first data line DL1 receives the second data signal DATA2 corresponding to the second pixel P2. The second pixel P2 next charges the second data signal DATA2 in response to the second gate signal G2 during the horizontal period 1 H.

As shown in FIG. 2B, the second pixel data voltage P2_DATA is charged in the second pixel P2 and the second pixel data voltage P2_DATA includes a first kickback voltage occurring at a falling edge timing of the first gate signal G1 and a second kickback voltage occurring at a falling edge timing of the second gate signal G2.

Therefore, referring to the pair of pixels P1 and P2 connected to the same data line DL1, a charging difference ΔQ between the pixel P1 that firstly receives the gate signal and the pixel P2 that subsequently receives the gate signal occur, such that a luminance difference between the pixels P1 and P2 occur.

According to an exemplary embodiment, in which the pair of pixels, which is connected to the same data line and connected to the pair of adjacent gate signals, are sequentially activated, the pixels including the same color filter are connected to the same gate line such that a display defect by the luminance difference may be improved.

In one exemplary embodiment, for example, the first, fourth and (K-1)-th pixels P1, P4 and PK-1 having the first color filter R may be connected to the first gate line GL1, the second, fifth and K-th pixels P2, P5 PK having the second color filter G may be connected to the second gate line GL2, and the third and sixth pixels P3 and P6 having the third color filter B are alternately connected to the first and second gate lines GL1 and GL2, as shown in FIG. 1.

In an exemplary embodiment, the luminance conduciveness of the first and second color filters R and G is greater than the luminance conduciveness of the third color filter B, such that the pixels having the first or second color filter are connected to the same gate line, and the pixels having the third color filter B are alternately connected to the pair of adjacent gate lines.

Therefore, in such an embodiment, a luminance uniformity of the forward-direction display panel may be improved.

Figure 3:
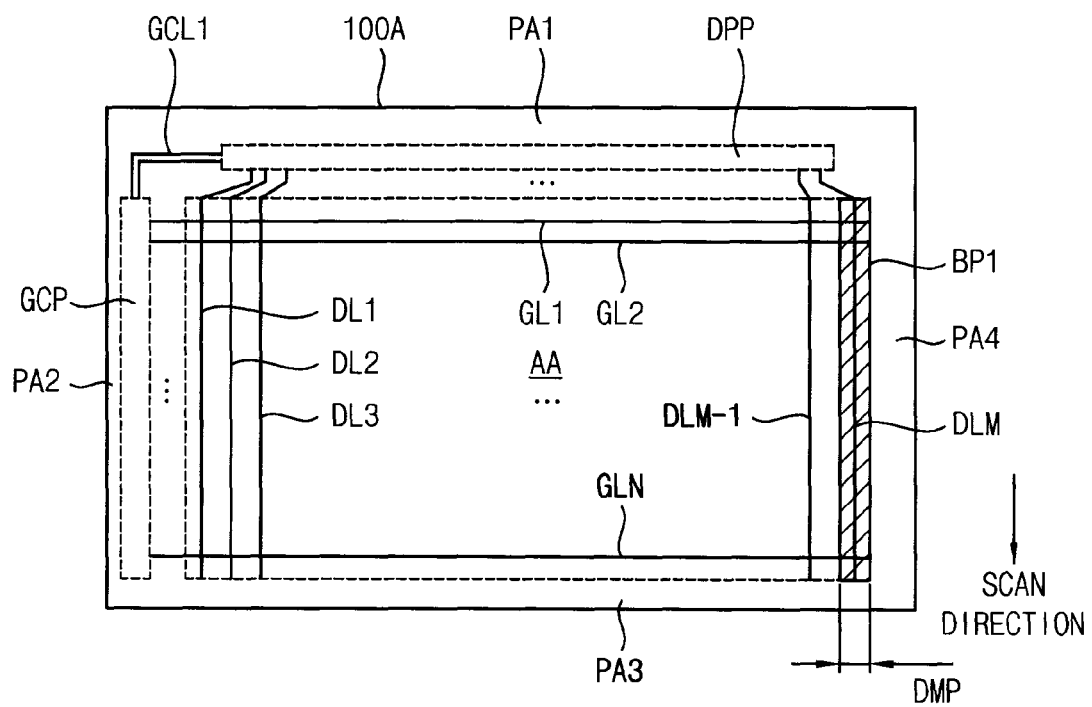
FIG. 3 is a plan view illustrating an exemplary embodiment of a forward-direction display panel according to the invention.

FIG. 3 is a plan view illustrating an exemplary embodiment of a forward-direction display panel according to the invention.

Referring to FIGS. 1 and 3, an exemplary embodiment of the forward-direction display panel 100A may display an image along a forward-direction that is a scan direction.

The forward-direction display panel 100A includes an active area AA and first, second, third and fourth peripheral areas PA1, PA2, PA3 and PA4 surrounding the active area AA.

In an exemplary embodiment, as shown in FIG. 3, a dummy pixel part DMP may be disposed in a right end portion of the active area AA. The dummy pixel part DMP includes pixels of a first dummy pixel column Cd1 having the first color filter R and a second dummy pixel column Cd2 having the second color filter G as shown in FIG. 1.

The forward-direction display panel 100A includes a plurality of data lines DL1, DL2, DL3, . . . , DLM, a plurality of gate lines GL1, GL2, . . . , GLN, a plurality of pixels P1, P2, P3, P4, P5, P6, . . . , PK-1, PK, a data pad part DPP, a gate control line GCL1 and a gate driver circuit GCP.

The data lines DL1, DL2, DL3, . . . , DLM are sequentially arranged from a left side to a right side of the active area AA. The gate lines GL1, GL2, . . . , GLN are sequentially arranged from an upper side to a lower side of the active area AA.

The data lines DL1, DL2, DL3, . . . , DLM, the gate lines GL1, GL2, . . . , GLN and the pixels P1, P2, P3, P4, P5, P6, . . . , PK-1 and PK are disposed in the active area AA. The pixel connecting structure of the data lines DL1, DL2, DL3, . . . , DLM, the gate lines GL1, GL2, . . . , GLN and the pixels P1, P2, P3, P4, P5, P6, . . . , PK-1 and PK is substantially the same as the pixel connecting structure of the exemplary embodiments of the display panel described referring to FIG. 1, and any repetitive detailed description thereof may be simplified or omitted.

The data pad part DPP is disposed in the first peripheral area PA1 which is adjacent to an end portion of the data lines DL1, DL2, DL3, . . . , DLM. The data pad part DPP may include a plurality of data pads, which receives data signals to drive the data lines DL1, DL2, DL3, . . . , DLM, and a plurality of gate control pads, which receives gate driving signals to drive the gate driver circuit GCP. According to an exemplary embodiment, the first peripheral area PA1 is located in an upper area of the active area AA.

In such an embodiment, the gate control line GCL1 may be disposed in the first peripheral area PAL The gate control line GCL1 extend from the data pad part DPP and is connected to an input terminal of the gate driver circuit GCP. The input terminal may be adjacent to the first gate line GL1. The gate control line GCL1 transfers the gate driving signal to the gate driver circuit GCP.

The gate driver circuit GCP is disposed in the second peripheral area PA2 which is adjacent to an end portion of the gate lines GL1, GL2, . . . , GLN. The gate driver circuit GCP is configured to sequentially provide the gate lines GL1, GL2, . . . , GLN with a plurality of gate signals along the forward-direction, that is, a scan direction.

FIGS. 4A to 4D are plan views illustrating an exemplary embodiment of a method of manufacturing the forward-direction display panel of FIG. 3.

FIGS. 1, 3 and 4A, a gate metal layer is provided, e.g., formed, on a first base substrate, and the gate metal layer is patterned to provide a gate metal pattern.

The gate metal pattern includes the gate lines GL1, GL2, . . . , GLN, the first gate electrode GE1 of the first transistor T1 and the second gate electrode GE2 of the second transistor T2, which are disposed in the active area AA.

The first gate electrode GE1 is connected to the first gate line GL1, and the second gate electrode GE2 is connected to the second gate line GL2.

The gate metal pattern includes the gate control line GCL1 which is disposed in the first peripheral area PA1.

In such an embodiment, a semiconductive pattern (not shown) may be provided on the first base substrate on which the gate metal pattern is provided. The semiconductive pattern may be provided on the first and second gate electrodes GE1 and GE2, respectively. The semiconductive pattern may include amorphous silicon or oxide semiconductor, for example.

Figure 4B:
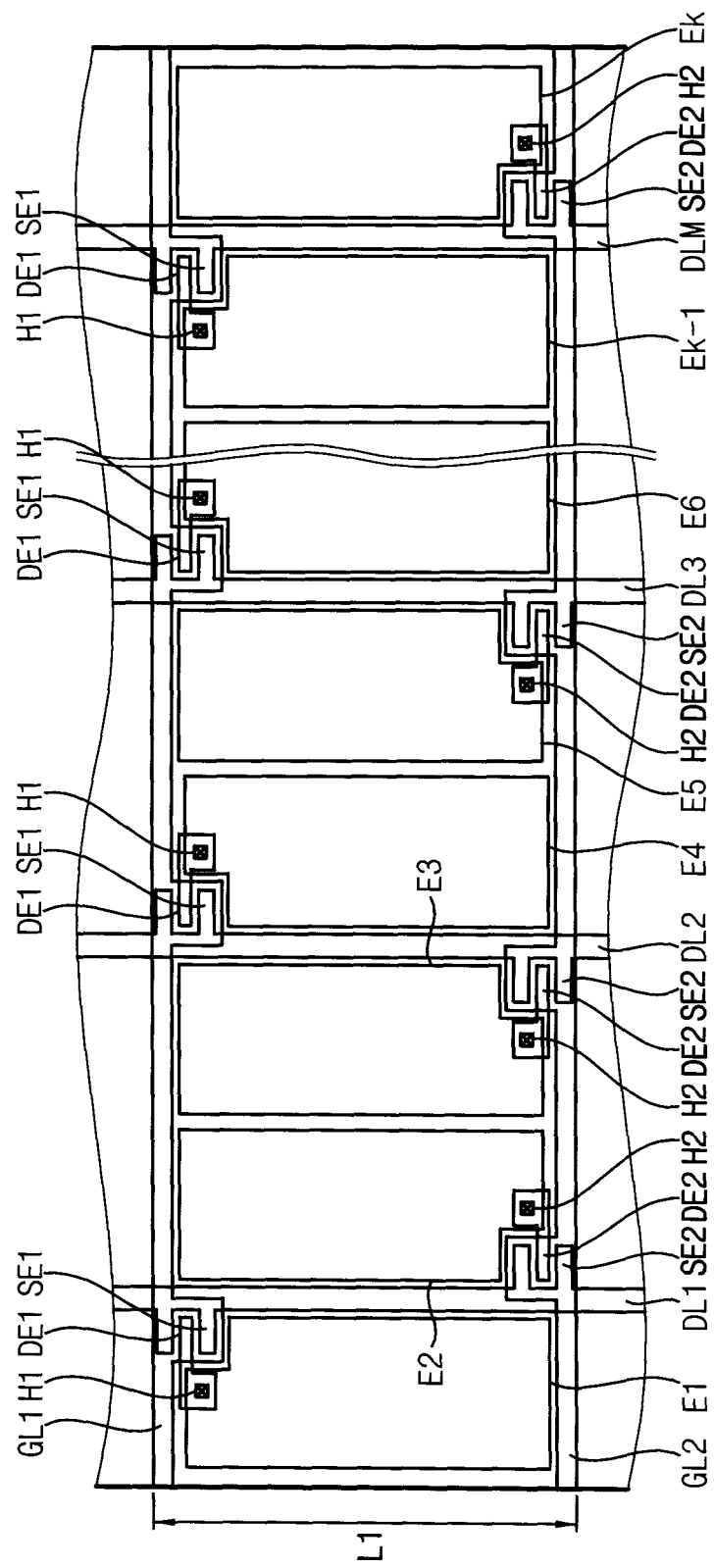

Referring to FIGS. 1, 3 and 4B, a source metal layer is provided on the first base substrate, on which the gate metal pattern is provided and a source metal pattern is provided by patterning the source metal layer.

The source metal pattern includes the data lines DL1, DL2, DL3, . . . , DLM, first source/drain electrode SE1 and DE1 of the first transistor T1 and second source/drain electrode SE2 and DE2 of the second transistor T2, which are disposed in the active area AA.

The first and second source electrodes SE1 and SE2 are connected to the data lines DL1, DL2, DL3, . . . , DLM. The first and second drain electrodes DE1 and DE2 are spaced apart from the first and second source electrodes SE1 and SE2, respectively.

An insulating layer, through which a plurality of contact holes H1 and H2 is formed, may be provided on the first base substrate on which the source metal pattern is provided.

A first contact hole H1 in the insulating layer exposes the first drain electrode DE1 of the first transistor T1, and a second contact hole H2 in the insulating layer exposes the second drain electrode DE2 of the second transistor T2.

A transparent conductive layer is provided on the first base substrate on which the insulating layer is provided, and the transparent conductive layer is patterned to form a plurality of pixel electrodes E1, E2, E3, E4, E5, E6, EK-1 and EK. The pixel electrodes E1, E2, E3, E4, E5, E6, EK-1 and EK are connected to the first and second drain electrodes DE1 and DE2 through the contact holes H1 and H2 formed through the insulating layer.

Figure 4C:
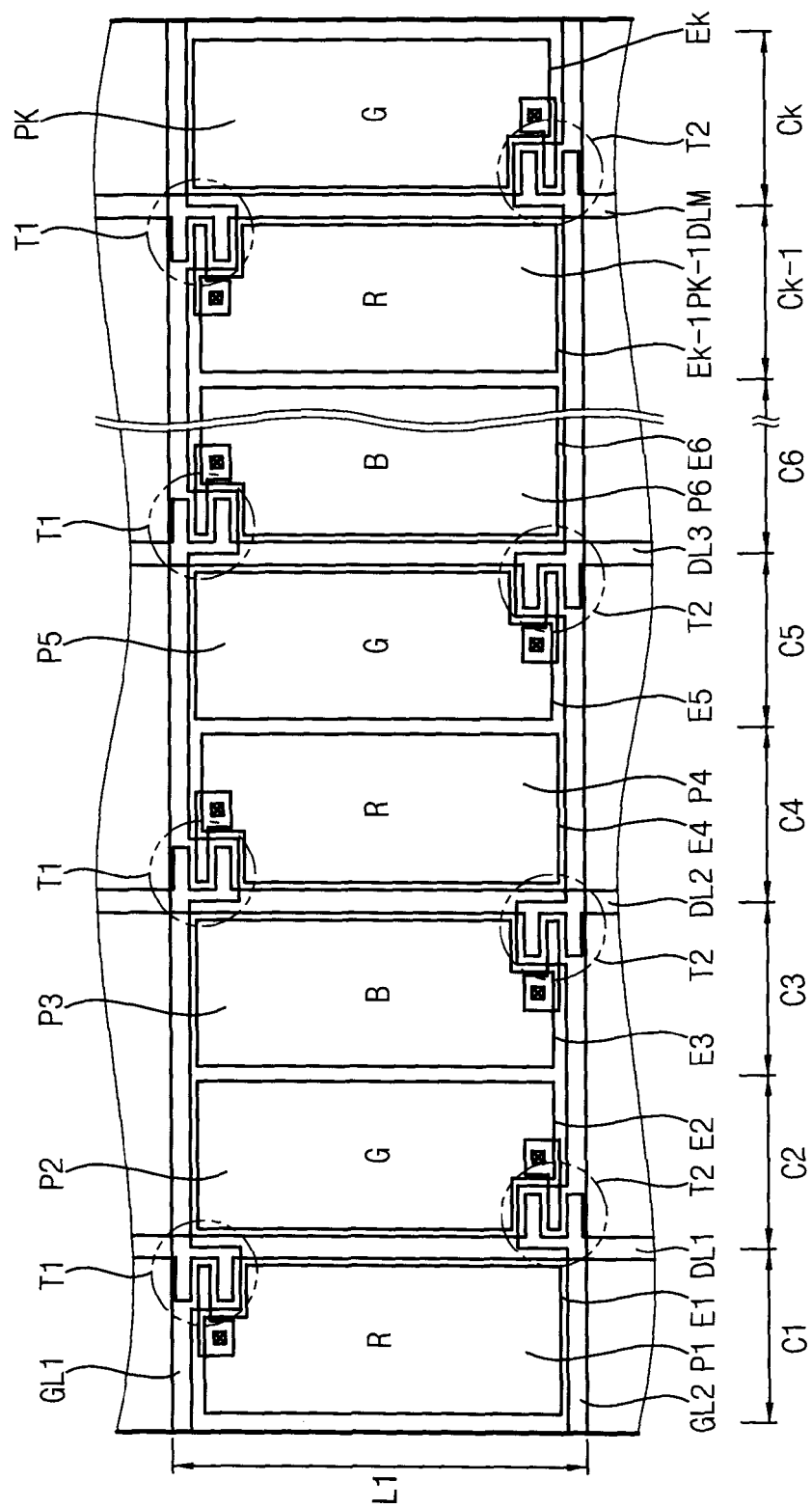

Referring to FIGS. 1, 3 and 4C, the first pixel P1 includes a first pixel electrode E1 which is connected to the first transistor T1, the second pixel P2 includes a second pixel electrode E2 which is connected to the second transistor T2, the third pixel P3 includes a third pixel electrode E3 which is connected to the second transistor T2, the fourth pixel P4 includes a fourth pixel electrode E4 which is connected to the first transistor T1, the fifth pixel P5 includes a fifth pixel electrode E5 which is connected to the second transistor T2, the sixth pixel P6 includes a sixth pixel electrode E6 which is connected to the first transistor T1, the (K-1)-th pixel PK-1 includes a (K-1)-th pixel electrode EK-1 which is connected to the first transistor T1, and the K-th pixel PK includes a K-th pixel electrode EK which is connected to the second transistor T2.

A plurality of color filters R, G and B is provided on a second base substrate, which is opposite to the first base substrate, and respectively corresponds to the pixel electrodes E1, E2, E3, E4, E5, E6, EK-1 and EK.

In an exemplary embodiment, as shown in FIG. 4C, the first color filter R overlaps the first, fourth and (K-1)-th pixel columns C1, C4 and CK-1, the second color filter G overlaps the second, fifth and K-th pixel columns C2, C5 and CK, and the third color filter B overlaps third and sixth pixel columns C3 and C6.

Figure 4D:
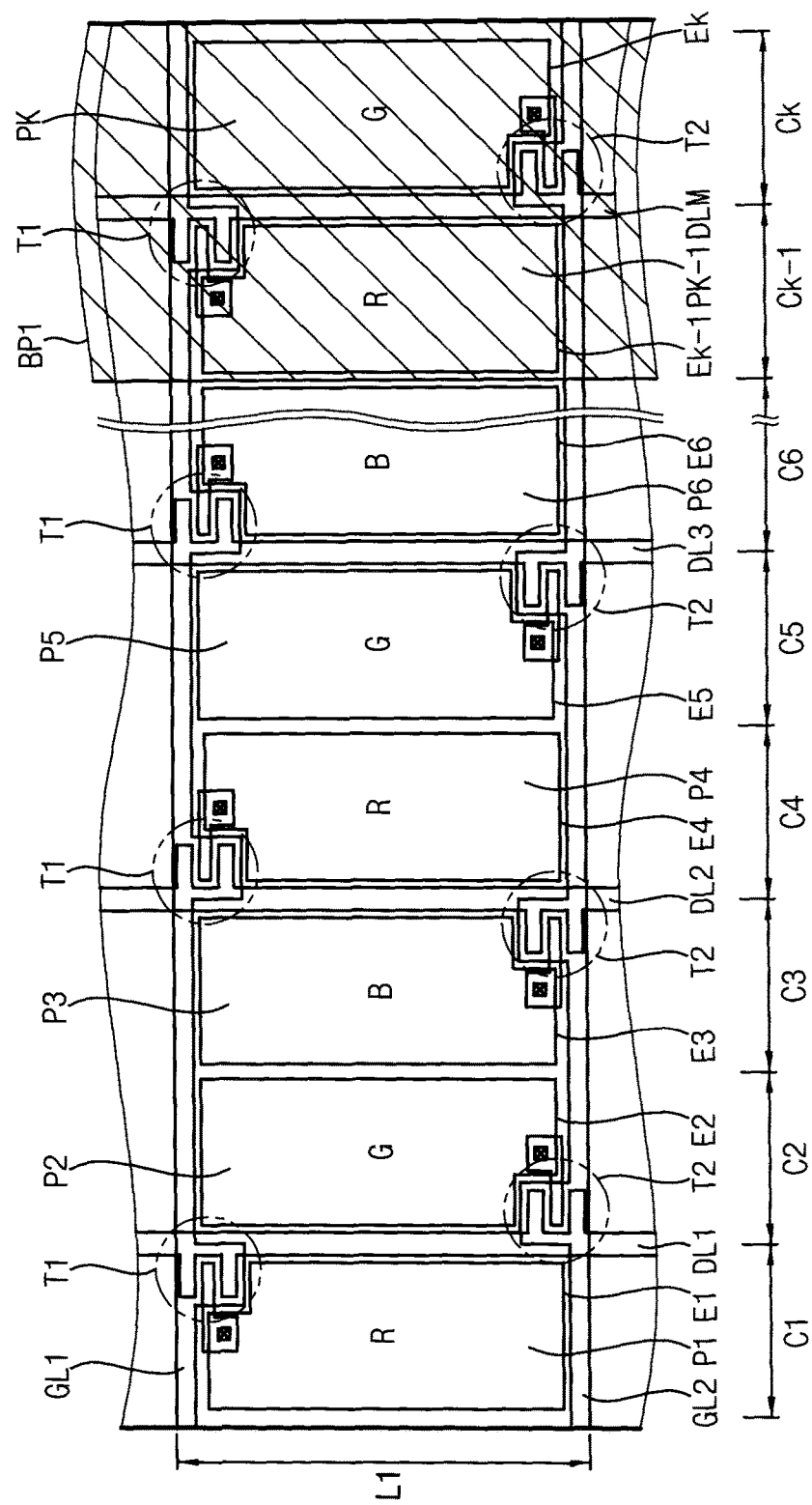

Referring to FIGS. 1, 3 and 4D, a blocking pattern BP1 is provided on the second base substrate on which the color filters R, G and B are provided.

The blocking pattern BP1 overlaps the dummy pixel part DMP which is defined in the right end portion of the active area AA. As shown in FIG. 4D, the blocking pattern BP1 overlaps the first color filter R corresponding to the (K-1)-th pixel column CK-1 and the second color filter G corresponding to the K-th pixel column CK. Herein, the (K-1)-th pixel column CK-1 may be a first dummy pixel column, the K-th pixel column CK may be a second dummy pixel column.

In an alternative exemplary embodiment, the first and second color filters R and G, which are provided on the (K-1)-th and K-th pixel columns CK-1 and CK of the dummy pixel part DMP, may be omitted. In such an embodiment, the dummy pixel part DMP may include only the blocking pattern BP1.

In such an embodiment, the blocking pattern may be provided in areas of the second base substrate corresponding to areas in which the gate lines GL1, GL2, . . . , GLN, the data lines DL1, DL2, DL3, . . . , DLM and the transistors T1 and T2 are provided.

Figure 5:
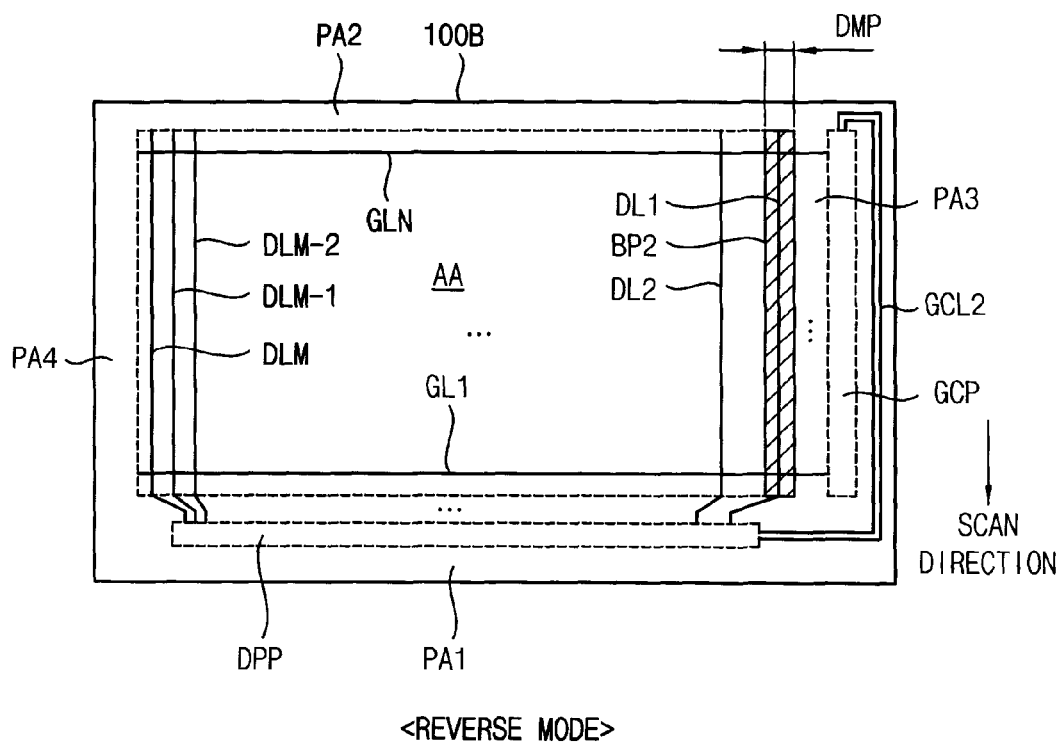
FIG. 5 is a plan view illustrating an exemplary embodiment of a reverse-direction display panel according to the invention.

FIG. 5 is a plan view illustrating an exemplary embodiment of a reverse-direction display panel according to the invention.

Referring to FIGS. 3 and 5, the position of the reverse-direction display panel 100B is rotated 180 degrees with respect to the position of the forward-direction display panel 100A, and the reverse-direction display panel 100B displays an image along a scan direction, which is a reverse-direction from the N-th gate line GLN to the first gate line GL1, opposite to the forward-direction of the forward-direction display panel 100A.

The reverse-direction display panel 100B includes an active area AA, and first, second, third and fourth peripheral areas PA1, PA2, PA3 and PA4 surrounding the active area AA, the positions of which are rotated 180 degrees with respect to the positions thereof in the forward-direction display panel 100A shown in FIG. 3.

In such an embodiment, a dummy pixel part DMP is disposed in a right end portion of the active area AA. The dummy pixel part DMP includes a first dummy pixel column Cd1 having a first color filter R and a second dummy pixel column Cd2 having a second color filter G.

The reverse-direction display panel 100B includes a plurality of data lines DL1, DL2, DL3, . . . , DLM, a plurality of gate lines GL1, GL2, . . . , GLN, a plurality of pixels P1, P2, P3, P4, P5, P6, . . . , PK-1, PK, a data pad part DPP, a gate control line GCL1 and a gate driver circuit GCP.

As described above, the reverse-direction display panel 100B is rotated 180 degrees with respect to the forward-direction display panel 100A as shown in FIG. 3.

Therefore, in such an embodiment, the M-th to first data lines DLM, DLM-1, DLM-2, . . . , DL1 are sequentially arranged from a left to a right of the active area AA, and the N-th to first gate lines GLN, . . . , GL1 are sequentially arranged from an upper side to a lower side of the active area AA.

The pixels are arranged substantially in a matrix form and have a pixel connecting structure which is rotated 180 degrees with respect to the forward-direction display panel 100A as shown in FIG. 3.

The data pad part DPP is disposed in the first peripheral area PA1. According to an exemplary embodiment, the first peripheral area PA1 is located in a lower area of the active area AA.

According to an exemplary embodiment, the gate control line GCL2 extend from the data pad part DPP, passes through the third peripheral area PA3 and is connected to an input terminal of the gate driver circuit GCP. The input terminal may be adjacent to the N-th gate line GLN.

The gate driver circuit GCP is configured to sequentially provide the gate lines GLN, . . . , GL2 and GL1 with a plurality of gate signals in response to a gate driving signal transferred through the gate control line GCL2. In an exemplary embodiment, the gate driver circuit GCP sequentially outputs the plurality of gate signals from the N-th gate line GLN to the first gate line GL1.

Figure 6A:
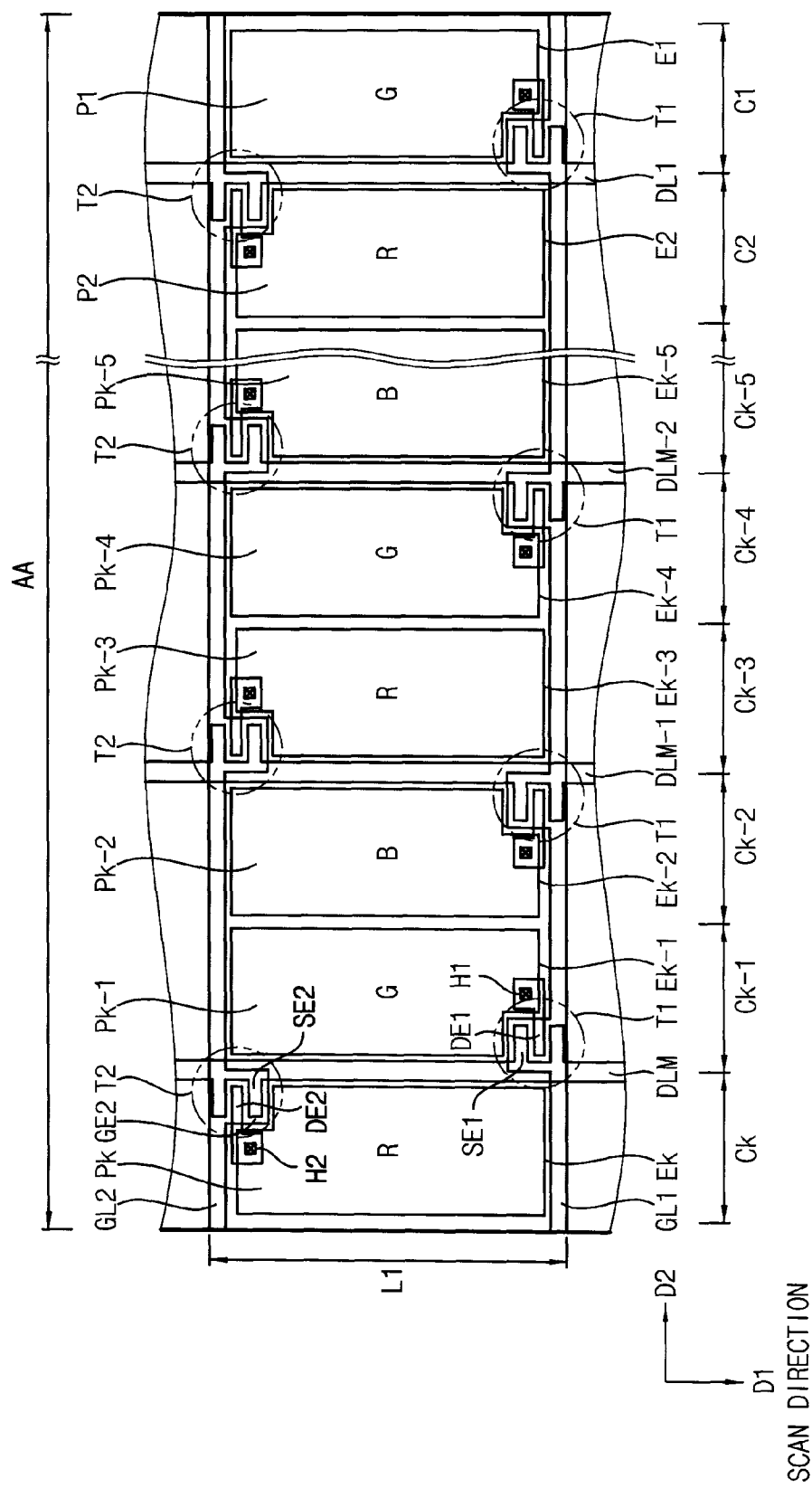
FIGS. 6A and 6B are plan views illustrating an exemplary embodiment of a method of manufacturing the reverse-direction display panel of FIG. 5.
Figure 6B:
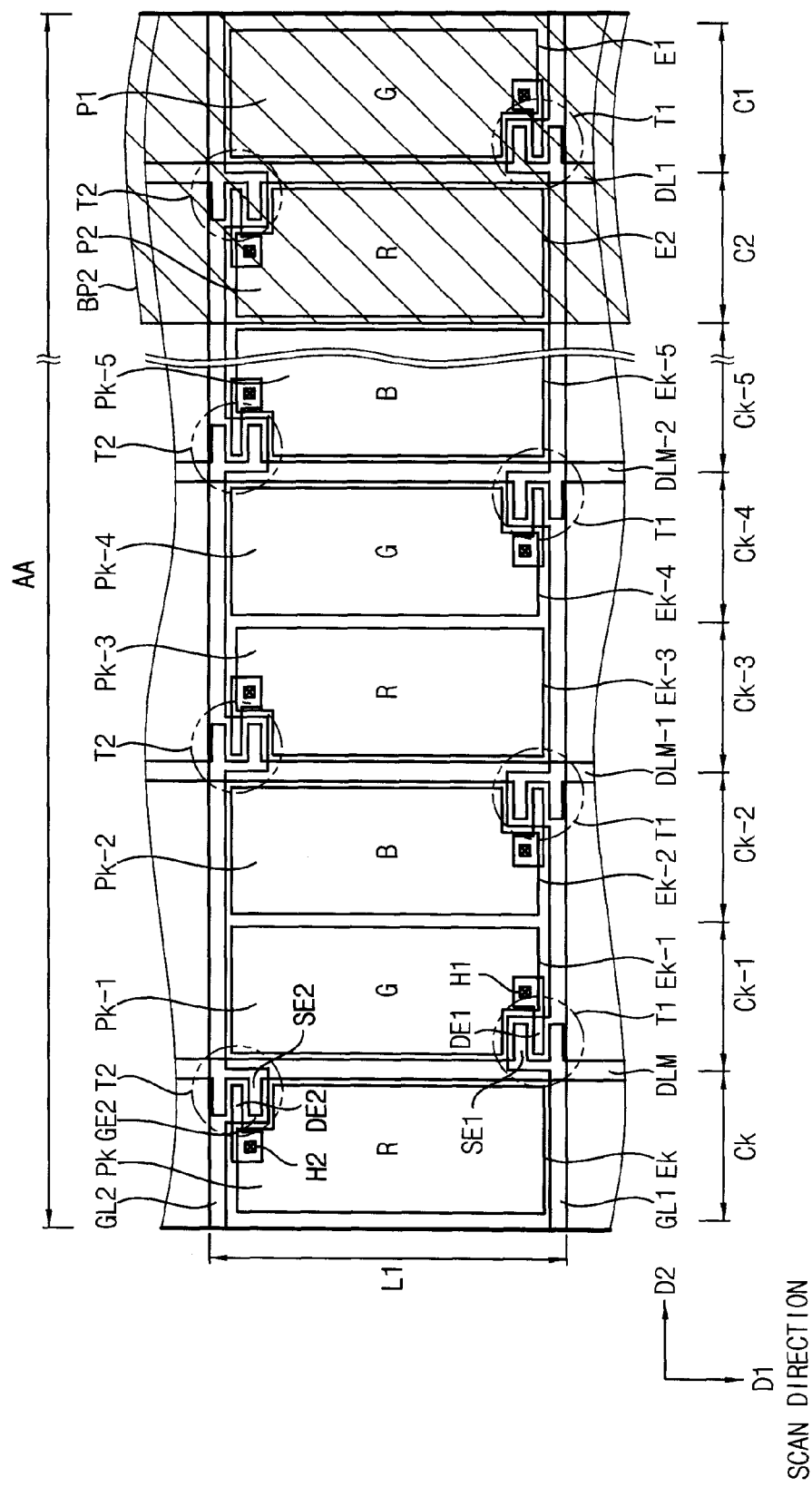

FIGS. 6A and 6B are plan views illustrating an exemplary embodiment of a method of manufacturing the reverse-direction display panel of FIG. 5.

The method of manufacturing the reverse-direction display panel 100B of FIG. 5 is substantially the same as the method of manufacturing the forward-direction display panel described referring to FIGS. 4A to 4D except for processes of providing the gate metal pattern, the color filters and the blocking pattern. The same or like elements shown in FIGS. 6A and 6B have been labeled with the same reference characters as used above to describe the exemplary embodiments of the method of FIGS. 4A to 4D, and any repetitive detailed description thereof will hereinafter be omitted or simplified.

Referring to FIGS. 5 and 6A, the gate pattern is provided, e.g., formed, on the first base substrate.

The gate pattern includes the gate lines GL1, GL2, ..., GLN, the first gate electrode GE1 of the first transistor T1 and the second gate electrode GE2 of the second transistor T2 which are disposed in the active area AA.

The first gate electrode GE1 is connected to the first gate line GL1 and the second gate electrode GE2 is connected to the second gate line GL2.

The gate metal pattern includes the gate control line GCL2 which is disposed in the first peripheral area PA1 and third peripheral area PA3.

Referring to the gate pattern, as described above, the gate control line GCL1 of the forward-direction display panel 100A is disposed in the first peripheral area PA1 and is connected to an input terminal of the gate driver circuit GCP1 which is adjacent to the first gate line GL1. However, in an exemplary embodiment, the gate control line GCL2 of the reverse-direction display panel 100B is disposed in the first and third peripheral areas PA1 and PA3 and is connected to an input terminal of the gate driver circuit GCP1 which is adjacent to the N-th gate line GLN.

Therefore, in an exemplary embodiment, a gate pattern mask for the forward-direction display panel may be modified as a gate pattern mask for the reverse-direction display panel 100B such that the gate metal pattern of the reverse-direction display panel 100B may be provided using the modified gate pattern mask.

In such an embodiment, a semiconductive pattern (not shown) may be provided on the first base substrate on which the gate metal pattern is provided. The semiconductive pattern may be provided on the first and second gate electrodes GE1 and GE2, respectively.

The semiconductive pattern of the reverse-direction display panel 100B may be formed using a semiconductive pattern mask substantially the same as a semiconductive pattern mask for the forward-direction display panel.

A source metal pattern is provided on the first base substrate on which the semiconductive pattern is provided.

The source metal pattern includes the data lines DL1, DL2, DL3, ..., DLM, first source/drain electrode SE1 and DE1 of the first transistor T1 and second source/drain electrode SE2 and DE2 of the second transistor T2 which are disposed in the active area AA.

The source metal pattern of the reverse-direction display panel 100B may be provided using a source pattern mask substantially the same as a source pattern mask for the forward-direction display panel.

An insulating layer, through which a plurality of contact holes H1 and H2 is formed, may be provided on the first base substrate on which the source metal pattern is provided.

In such an embodiment, the contact holes H1 and H2 of the reverse-direction display panel 100B may be formed using a contact hole mask for the forward-direction display panel after providing the insulating layer on the first substrate.

A plurality of pixel electrodes E1, E2, E3, E4, E5, E6, EK-1 and EK is provided on the first base substrate on the insulating layer. The pixel electrodes E1, E2, E3, E4, E5, E6, EK-1 and EK are connected to the first and second drain electrodes DE1 and DE2 through the contact holes H1 and H2 formed through the insulating layer.

The pixel electrodes of the reverse-direction display panel 100B may be provided using a pixel electrode mask substantially the same as a pixel electrode mask for the forward-direction display panel.

A pixel connecting structure of the reverse-direction display panel 100B is rotated 180 degrees with respect to that of the forward-direction display panel 100A as shown in FIG. 1.

Thus, referring to FIG. 6A, K-th pixel PK and (K-1)-th pixel PK-1 which are connected to the M-th data line DLM are disposed in a left end portion of the active area AA, and second pixel P2 and first pixel P1 which are connected to the first data line DL1 are disposed in a right end portion of the active area AA.

The K-th pixel PK includes the second transistor T2 which is connected to the M-th data line DLM, the second gate line GL2 and a K-th pixel electrode EK. The (K-1)-th pixel PK-1 includes the first transistor T1 which is connected to the M-th data line DLM, the first gate line GL and a (K-1)-th pixel electrode EK-1.

The (K-2)-th pixel PK-2 includes the first transistor T1 which is connected to the (M-1)-th data line DLM-1, the first gate line GL1 and a (K-2)-th pixel electrode EK-2. The (K-3)-th pixel PK-3 includes the second transistor T2 which is connected to the (M-1)-th data line DLM-1, the second gate line GL2 and a (K-3)-th pixel electrode EK-3.

The (K-4)-th pixel PK-4 includes the first transistor T1 which is connected to the (M-2)-th data line DLM-2, the first gate line GL1 and a (K-4)-th pixel electrode EK-4. The (K-5)-th pixel PK-5 includes the second transistor T2 which is connected to the (M-2)-th data line DLM-2, the second gate line GL2 and a (K-5)-th pixel electrode EK-5.

The second pixel P2 includes the second transistor T2 which is connected to the first data line DL1, the second gate line GL2 and a second pixel electrode E2. The first pixel P1 includes the first transistor T1 which is connected to the first data line DL1, the first gate line GL1 and a first pixel electrode E1.

Then, a plurality of color filters R, G and B is provided on a second base substrate, which is opposite to the first base substrate.

In such an embodiment of the reverse-direction display panel 100B, the second gate line GL2 is firstly activated and then the first gate line GL1 is activated. Therefore, the color filters R, G and B of the reverse-direction display panel 100B have a different arrangement from those of the forward-direction display panel 100A.

In one exemplary embodiment, for example, the first color filter R overlaps with K-th, (K-3)-th and second pixel columns CK, CK-3 and C2 respectively corresponding to K-th, (K-3)-th and second pixels PK, PK-3 and P2 which are connected to the second gate line GL2 firstly activated.

The second color filter G overlaps K-1-th, (K-4)-th and first pixel columns CK, CK-3 and C1 respectively corresponding to (K-1)-th, (K-4)-th and first pixels PK, PK-3 and P1 which are connected to the first gate line GL1 next activated.

The third color filter B overlaps (K-2)-th and (K-5)-th pixel columns CK-2 and CK-5 respectively corresponding to (K-2)-th and (K-5)-th pixels PK-2 and PK-5.

Referring to process manufacturing the color filters, the second color filter G of the reverse-direction display panel 100B may be provided using a mask for the first color filter R of the forward-direction display panel 100A. The first color filter R of the reverse-direction display panel 100B may be provided using a mask for the second color filter G of the forward-direction display panel 100A. The third color filter B of the reverse-direction display panel 100B may be provided using a mask for the third color filter B of the forward-direction display panel 100A.

Therefore, the color filters R, G and B of the reverse-direction display panel 100B may be provided by a mask sequence different from a mask sequence for the forward-direction display panel 100A using substantially the same masks as each other.

Referring to FIGS. 5 and 6B, a blocking pattern BP2 is provided on the second base substrate on which the color filters R, G and B are provided.

The blocking pattern BP2 overlaps the dummy pixel part DMP which is defined in the right end portion of the active area AA. The blocking pattern BP2 overlaps with the first color filter R corresponding to the second pixel column C2 and the second color filter G corresponding to the first pixel column C1.

According to an exemplary embodiment, a first dummy pixel column Cd1 is the second pixel column C2 having the first color filter R and the second dummy pixel column Cd2 is the first pixel column C1 having the second color filter G.

Therefore, in such an embodiment, the blocking pattern BP2 of the reverse-direction display panel 100B may be provided using a blocking pattern mask which is modified from a blocking pattern mask of the forward-direction display panel 100A.

In an alternative exemplary embodiment, the first and second color filters R and G which are provided on the second and first pixel columns C2 and C1 of the dummy pixel part DMP may be omitted. In such an embodiment, the dummy pixel part DMP may include only the blocking pattern BP2.

In such an embodiment, the blocking pattern may be provided in areas of the second base substrate corresponding to areas in which the gate lines GL1, GL2, . . . , GLN, the data lines DL1, DL2, DL3, . . . , DLM and the transistors T1 and T2 are disposed.

As described above, in such an embodiment, the reverse-direction display panel 100B may be manufactured through substantially the same processes except for processes of forming the gate metal pattern, the color filters and the blocking pattern. The gate metal pattern, the color filters and the blocking pattern of the reverse-direction display panel 100B may be provided using the modified gate pattern mask, the same color masks having different sequence and the modified blocking pattern mask, respectively.

Therefore, processes of manufacturing the reverse-direction display panel may use partial masks used in processes of manufacturing the forward-direction display panel such that the processes of manufacturing the reverse-direction display panel may be simplified and cost of manufacture of the forward-direction display panel and the reverse-direction display panel may be decreased.

In such an embodiment, referring to the pixel connection structure of the reverse-direction display panel 100B, the K-th, (K-3)-th and second pixels PK, PK-3 and P2 having the first color filter R among the pixels in the same pixel row are electrically connected to the second gate line GL2 which is firstly activated along the scan direction of the reverse-direction.

The K-1-th, (K-4)-th and first pixels PK-1, PK-4 and P1 having the second color filter G among the pixels in the same pixel row are electrically connected to the first gate line GL1 which is next activated along the scan direction of the reverse-direction.

The (K-2)-th and (K-5)-th pixels PK-2 and PK-5 having the third color filter B among the pixels in the same pixel row are alternately connected to the first and second gate lines GL1 and GL2.

Therefore, in such an embodiment, the luminance conduciveness of the first and second color filters R and G is greater than the luminance conduciveness of the third color filter B. Thus, the pixels having the first or second color filter are connected to the same gate line and the pixels having the third color filter B are alternately connected to the pair of adjacent gate lines.

Therefore, a luminance uniformity of the reverse-direction display panel may be improved.

Figure 7:
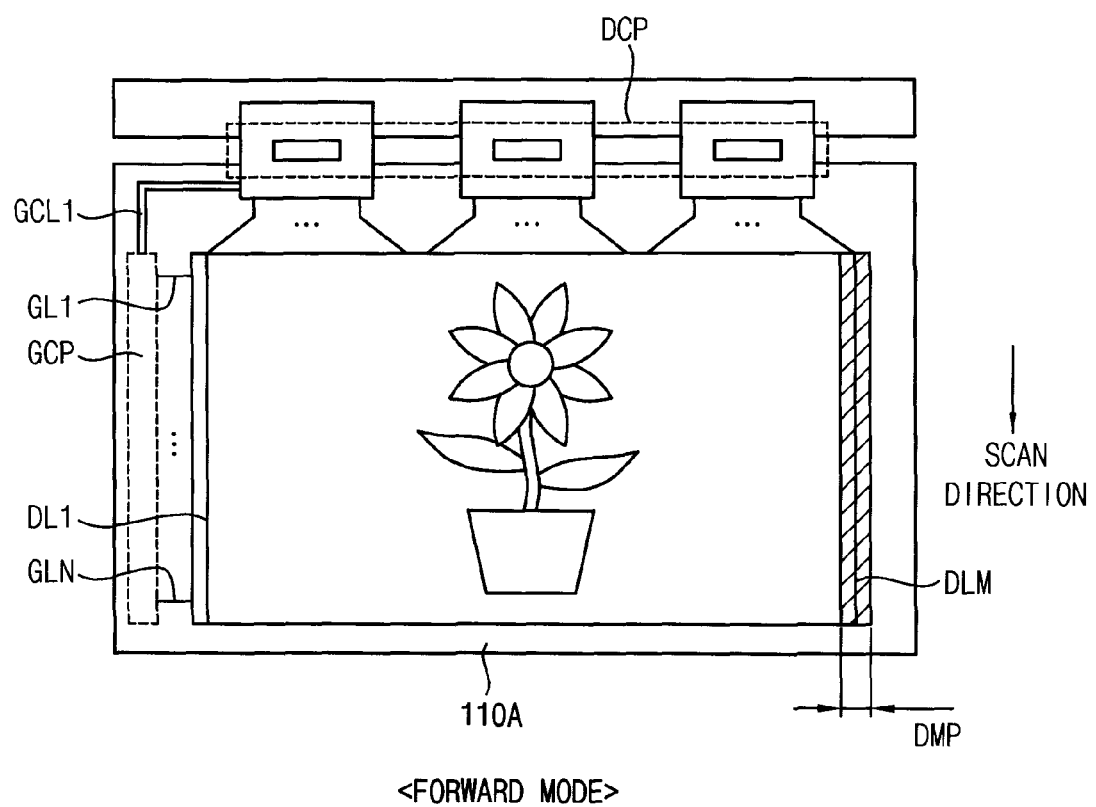
FIG. 7 is a plan view illustrating an alternative exemplary embodiment of a forward-direction display apparatus according to the invention.

FIG. 7 is a plan view illustrating an alternative exemplary embodiment of a forward-direction display apparatus according to the invention.

Referring to FIG. 7, the forward-direction display apparatus may include a forward-direction display panel 110A, a gate driver circuit GCP and a data driver circuit DCP.

In such an embodiment, the forward-direction display panel 110A shown in FIG. 7 is substantially the same as the forward-direction display panel 100A as shown in FIG. 3 except that the blocking pattern BP1 in the dummy pixel part DMP is omitted. The same or like elements shown in FIG. 7 have been labeled with the same reference characters as used above to describe the exemplary embodiments of the forward-direction display apparatus shown in FIG. 3, and any repetitive detailed description thereof will hereinafter be omitted or simplified.

The forward-direction display panel 110A includes first to N-th gate lines GL1, GL2, . . . , GLN which are sequentially arranged from an upper side to a lower side of the active area AA, first to M-th data lines DL1, . . . , DLM which are sequentially arranged from a left side to a right side of the active area AA and a plurality of pixels which is arranged substantially in a matrix form having a pixel row and a pixel column The pixels in a same pixel row are connected to a pair of adjacent gate lines, and the pixels in a pair of adjacent pixel columns are connected to a same data line.

The gate driver circuit GCP receives a gate driving signal through a gate control line GCL1 which is connected to a first end portion thereof adjacent to the first gate line GL1. The gate driver circuit GCP is configured to sequentially output a plurality of gate signals from the first gate line GL1 to the N-th gate line GLN.

The data driver circuit DCP is disposed in an upper area of the active area AA and is configured to output a data signal the data lines DL1, . . . , DLM.

In an exemplary embodiment, as shown in FIG. 3, the data driver circuit DCP may be configured to provide the first to (M-1)-th data lines DL1, . . . , DLM-1 with a data signal corresponding to a normal image. In an alternative exemplary embodiment, the data driver circuit DCP may be configured to provide the M-th data line DLM with a data signal corresponding to a black image. In such an embodiment, the active area AA of the forward-direction display panel 110A displays the normal image and the dummy pixel part DMP displays the black image.

According to an exemplary embodiment, the pixels in the dummy pixel part DMP displays the black image such that a same effect as that of the exemplary embodiments including the blocking pattern BP1 as shown in FIG. 3 may be obtained.

Figure 8:
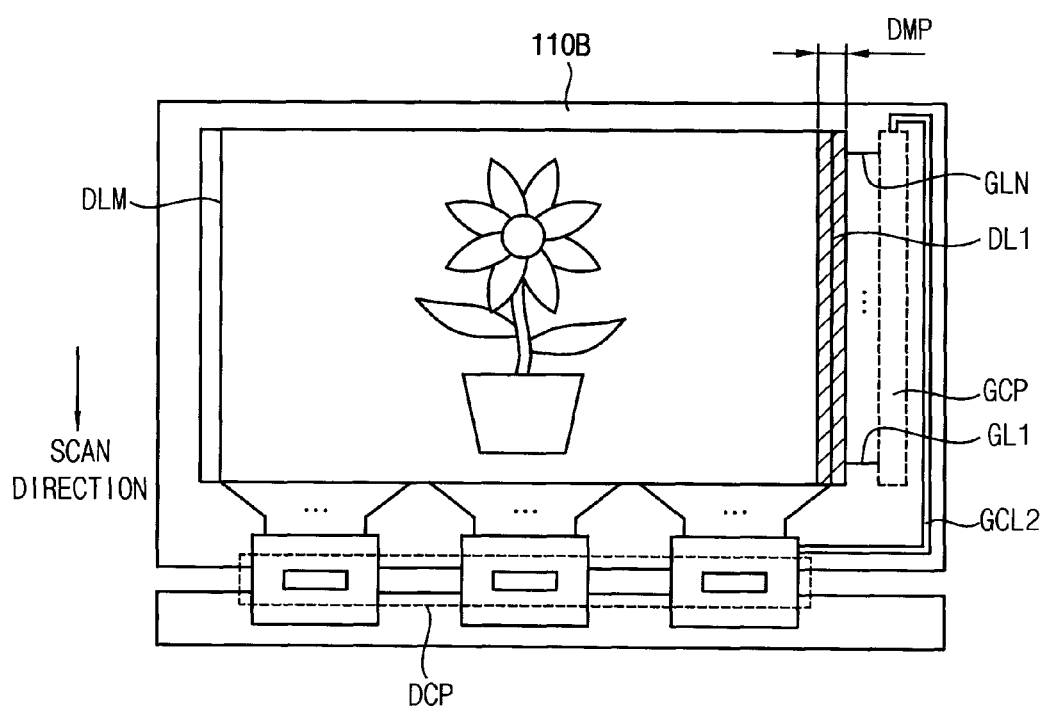
FIG. 8 is a plan view illustrating an alternative exemplary embodiment of a reverse-direction display apparatus according to the invention.

FIG. 8 is a plan view illustrating an alternative exemplary embodiment of a reverse-direction display apparatus according to the invention.

Referring to FIG. 8, an exemplary embodiment of the reverse-direction display apparatus may include a reverse-direction display panel 110B, a gate driver circuit GCP and a data driver circuit DCP.

The reverse-direction display panel 110B shown in FIG. 8 is substantially the same as the reverse-direction display panel 100B as shown in FIG. 5 except that the blocking pattern BP2 in the dummy pixel part DMP is omitted. The same or like elements shown in FIG. 8 have been labeled with the same reference characters as used above to describe the exemplary embodiments of the forward-direction display apparatus shown in FIG. 5, and any repetitive detailed description thereof will hereinafter be omitted or simplified.

The reverse-direction display panel 110B includes N-th to first gate lines GLN, . . . , GL1 which are sequentially arranged from an upper side to a lower side in the active area AA, M-th to first data lines DLM, . . . , DL1 which are sequentially arranged from a left side to a right side in the active area AA and a plurality of pixels which is arranged substantially in a matrix form having a pixel row and a pixel column. The pixels in a same pixel row are connected to a pair of adjacent gate lines, and the pixels in a pair of adjacent pixel columns are connected to a same data line.

The gate driver circuit GCP receives a gate driving signal through a gate control line GCL2 which is connected to a second end portion thereof adjacent to the N-th gate line GLN. The gate driver circuit GCP is configured to sequentially output a plurality of gate signals from the N-th gate line GLN to the first gate line GL1.

The data driver circuit DCP is disposed in a lower area of the active area AA and is configured to output a data signal the data lines DL1, . . . , DLM.

In an exemplary embodiment, as shown in FIG. 5, the data driver circuit DCP may be configured to provide the M-th to second data lines DLM, . . . , DL2 with a data signal corresponding to a normal image. In an alternative exemplary embodiment, the data driver circuit DCP may be configured to provide the first data line DL1 with a data signal corresponding to a black image. In such an embodiment, the active area AA of the reverse-direction display panel 110B displays the normal image, and the dummy pixel part DMP displays the black image.

According to an exemplary embodiment, the pixels in the dummy pixel part DMP displays the black image such that a same effect as that of previous exemplary embodiment including the blocking pattern BP2 as shown in FIG. 6B may be obtained.

As described above, in an exemplary embodiment, the dummy pixel part may include the blocking pattern. Alternatively, the dummy pixel part may not include the blocking pattern and may be driven with the data signal corresponding to the black image. Thus, a viewer may not see an image from the dummy pixel part.

According to exemplary embodiments of the invention, processes of manufacturing the reverse-direction display panel may use masks that may be used in processes of manufacturing the forward-direction display panel such that the processes of manufacturing the reverse-direction display panel and the processes of manufacturing the forward-direction display panel may be simplified, and cost of manufacturing the reverse-direction display panel and the forward-direction display panel may be decreased.

In such embodiments, the luminance conduciveness of the first and second color filters R and G is greater than the luminance conduciveness of the third color filter B. Thus, the pixels having the first or second color filter are connected to the same gate line and the pixels having the third color filter B are alternately connected to the pair of adjacent gate lines. Thus, a luminance uniformity of the forward-direction display panel and the reverse-direction display panel may be improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display panel comprising:
    a plurality of pixels disposed in an active area and arranged substantially in a matrix from comprising a pixel row and a pixel column;
    a first gate line disposed adjacent to a first side of the pixel row and connected to a first pixel in the pixel row;
    a second gate line disposed adjacent to a second side of the pixel row and connected to a second pixel in the pixel row;
    a plurality of data lines crossing the first and second gate lines, wherein the pixels in a pair of adjacent pixel columns are connected to a same data line; and
    a blocking pattern which overlaps a pixel column disposed in an end portion of the active area,
    wherein the pixels comprise:
        the first pixel connected to a first data line and the first gate line;
        the second pixel connected to the first data line and the second gate line;
        a third pixel connected to a second data line and the second gate line;
        a fourth pixel connected to the second data line and the first gate line;
        a fifth pixel connected to a third data line and the second gate line;
        a sixth pixel connected to the third data line and the first gate line;
        a (K-1)-th pixel connected to an M-th data line and the first gate line, wherein the M-th data line is a last data line disposed in a right end portion, and each of M and K is a natural number; and
        a K-th sixth pixel connected to the M-th data line and the second gate line,
    wherein the first, second, third, fourth, fifth, sixth, (K-1)-th and K-th pixels are disposed in the pixel row, and
    wherein the blocking pattern is disposed in the right end portion of the active area.

2. The display panel of claim 1, wherein the blocking pattern is disposed on a (K-1)-th pixel column and a K-th pixel column of the active area.

3. The display panel of claim 1, wherein the blocking pattern overlaps a (K-1)-th pixel column and a K-th pixel column respectively corresponding to the (K-1)-th and K-th pixels.

4. The display panel of claim 3, wherein
the first, fourth and (K-1)-th pixels comprise a first color filter,
the second, fifth and K-th pixels comprise a second color filter, and
the third and sixth pixels comprise a third color filter.

5. The display panel of claim 4, wherein the first gate line is disposed before the second gate line in a scan direction, such that the first gate line is activated and then the second gate line is activated.

6. The display panel of claim 5, wherein
the first color filter is a red filter,
the second color filter is a green filter, and
the third color filter is a blue filter.

7. A method of manufacturing a display panel, the method comprising:
providing first to N-th gate lines and a gate electrode of a transistor in an active area on a base substrate, wherein N is a natural number;
providing first to M-th data lines crossing the gate lines, a source electrode of the transistor and a drain electrode of the transistor in the active area on the base substrate, wherein M is a natural number;
providing pixel electrodes of a pixel row, which are connected to a pair of adjacent gate lines, in the active area on the base substrate, wherein pixel electrodes of the pixel row in a pair of adjacent pixel columns are connected to a same data line; and
providing a blocking pattern to overlap the pixel electrodes of a pixel column disposed in an end portion of the active area,
wherein the providing the pixel electrodes of the pixel row comprises:
providing a first pixel electrode connected to the first data line and the first gate line:
providing a second pixel electrode connected to the first data line and the second gate line;
providing a third pixel electrode connected to the second data line and the second gate line;
providing a fourth pixel electrode connected to the second data line and the first gate line;
providing a fifth pixel electrode connected to the third data line and the second gate line;
providing a sixth pixel electrode connected to the third data line and the first gate line;
providing a (K-1)-th pixel electrode connected to the M-th data line and the first gate line, wherein the M-th data line is a last data line disposed in the end portion of the active area, and K is a natural number; and
providing a K-th pixel electrode connected to the M-th data line and the second gate line,
wherein the first, second, third, fourth, fifth, sixth, (K-1)-th and K-th pixel electrodes are provided in the pixel row.

8. The method of claim 7, further comprising:
providing a gate control line disposed in a peripheral area adjacent to the active area in which the first gate line is disposed,
wherein the gate control line is connected to an input terminal of a gate driver circuit which provides the first to N-th gate lines with a plurality of gate signals.

9. The method of claim 7, wherein the blocking pattern overlaps the (K-1)-th pixel electrode and the K-th pixel electrode.

10. The method of claim 9, further comprising:
providing red, green and blue filters to overlap the pixel electrodes,
wherein
the red filter overlaps the first, fourth and (K-1)-th pixel electrodes,
the green filter overlaps the second, fifth and K-th pixel electrodes, and
the blue filter overlaps the third and sixth pixel electrodes.

11. A method of manufacturing a display panel, the method comprising:
providing first to N-th gate lines and a gate electrode of a transistor in an active area on a base substrate, wherein N is a natural number;
providing first to M-th data lines crossing the gate lines, a source electrode of the transistor and a drain electrode of the transistor in the active area on the base substrate, wherein M is a natural number;
providing pixel electrodes of a pixel row, which are connected to a pair of adjacent gate lines, in the active area on the base substrate, wherein pixel electrodes of the pixel row in a pair of adjacent pixel columns are connected to a same data line; and
providing a blocking pattern to overlap the pixel electrodes of a pixel column disposed in an end portion of the active area,
wherein the providing the pixel electrodes of the pixel row comprises:
providing a K-th pixel electrode connected to the M-th data line and the second gate line;
providing a (K-1)-th pixel electrode connected to the M-th data line and the first gate line;
providing a (K-2)-th pixel electrode connected to the (M-1)-th data line and the first gate line;
providing a (K-3)-th pixel electrode connected to the (M-1)-th data line and the second gate line;
providing a (K-4)-th pixel electrode connected to the (M-2)-th data line and the first gate line;
providing a (K-5)-th pixel electrode connected to the (M-2)-th data line and the second gate line;
providing a second pixel electrode connected to the first data line and the second gate line, wherein the first data line is a last data line disposed in the end portion of the active area, and K is a natural number; and
providing a first pixel electrode connected to the first data line and the first gate line,
wherein the K-th, (K-1)-th, (K-2)-th, (K-3)-th, (K-4)-th, (K-5)-th, second and first pixel electrodes are provided in the pixel row.

12. The method of claim 11, further comprising:
providing a gate control line disposed in a peripheral area adjacent to the active area in which the N-th gate line is disposed,
wherein the gate control line is connected to an input terminal of a gate driver circuit which provides the first to N-th gate lines with a plurality of gate signals.

13. The method of claim 11, wherein the blocking pattern overlaps the first pixel electrode and the second pixel electrode.

14. The method of claim 13, further comprising:
providing red, green and blue filters to overlap the pixel electrodes,
wherein
the red filter overlaps the K-th, (K-3)-th and second pixel electrodes,
the green filter overlaps the (K-1)-th, (K-4)-th and first pixel electrodes, and the blue filter overlaps the (K-2)-th and (K-5)-th pixel electrodes.

15. A display apparatus comprising:
a display panel comprising:
  first to N-th gate lines which are sequentially arranged from an upper side to a lower side in an active area;
  first to M-th data lines which are sequentially arranged from a left side to a right side in the active area;
  a plurality of pixels which comprises a pixel row and a pixel column, wherein the pixels in a same pixel row are connected to a pair of adjacent gate lines, the pixels in a pair of adjacent pixel columns are connected to a same data line, and each of M and N is a natural number;
a gate driver circuit configured to provide a plurality of gate signals to the first to N-th gate lines; and
a data driver circuit disposed in a peripheral area adjacent to the first data line and configured to provide a pixel column which is disposed in a right end portion of the active area with a data signal corresponding to a black image.

16. The display apparatus of claim 15, wherein the data driver circuit is configured to provide the first to (M-1)-th data lines with the data signal corresponding to a normal image and to provide the M-th data line with the data signal corresponding to the black image.

17. A display apparatus comprising:
a display panel comprising:
  N-th to first gate lines which are sequentially arranged from an upper side to a lower side in an active area;
  M-th to first data lines which are sequentially arranged from a left side to a right side in the active area;
  a plurality of pixels which comprises a pixel row and a pixel column, wherein the pixels in a same pixel row are connected to a pair of adjacent gate lines, the pixels in a pair of adjacent pixel columns are connected to a same data line, and each of M and N is a natural number;
a gate driver circuit configured to sequentially provide a plurality of gate signals to the N-th to first gate lines; and
a data driver circuit disposed in a peripheral area adjacent to the first data line and configured to provide a pixel column disposed in a right end portion of the active area with a data signal corresponding to a black image.

18. The display apparatus of claim 17, wherein the data driver circuit is configured to provide M-th to second data lines with the data signal corresponding to a normal image and to provide the first data line with the data signal corresponding to the black image.

\* \* \* \* \*